United States Patent
Swart et al.

(10) Patent No.: US 11,999,367 B2
(45) Date of Patent: Jun. 4, 2024

(54) AUTOMATED DYNAMIC THROTTLE REQUEST FILTERING

(71) Applicant: PACCAR Inc, Bellevue, WA (US)

(72) Inventors: Charles Wayne Reinhardt Swart, Bellingham, WA (US); Vedran Curgus, Bellingham, WA (US); Burton Edwin Waite, III, Bellingham, WA (US); Victor Perez, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 17/483,307

(22) Filed: Sep. 23, 2021

(65) Prior Publication Data

US 2023/0086575 A1 Mar. 23, 2023

(51) Int. Cl.
*B60W 50/06* (2006.01)
*B60W 40/06* (2012.01)

(52) U.S. Cl.
CPC ............ *B60W 50/06* (2013.01); *B60W 40/06* (2013.01); *B60W 2520/28* (2013.01); *B60W 2540/10* (2013.01)

(58) Field of Classification Search
CPC .. B60W 50/06; B60W 40/06; B60W 2520/28; B60W 2540/10
See application file for complete search history.

(56) References Cited

U.S. PATENT DOCUMENTS

| 6,128,564 | A | 10/2000 | Graf |
| 7,739,019 | B2 | 6/2010 | Robert et al. |
| 8,060,275 | B2 * | 11/2011 | Asgari ............... B60W 50/045 701/72 |
| 11,092,220 | B1 | 8/2021 | Mancini |

(Continued)

FOREIGN PATENT DOCUMENTS

| CN | 112392945 A | 2/2021 | |
| CN | 113071496 A * | 7/2021 | ............ B60W 40/00 |

(Continued)

OTHER PUBLICATIONS

Translation of WO 2017151996 A1.*

(Continued)

*Primary Examiner* — Tyler J Lee
*Assistant Examiner* — Yufeng Zhang
(74) *Attorney, Agent, or Firm* — Merchant & Gould P.C.

(57) ABSTRACT

Dynamic throttle pedal filtering of a vehicle is provided. An automated throttle filtering system may be included in the vehicle that may operate to filter throttle pedal input based on detection of a rough driving surface. The rough driving surface detection may be based on an evaluation of wheel speed signals or an indication of traction loss. The throttle pedal input may be filtered corresponding to rough driving surface magnitude values determined based on the wheel speed signals. For example, filtered torque demand values may be determined based on the rough driving surface magnitude values and included in a torque demand request communicated to the vehicle's powertrain system. The resulting torque output may modulate an undesirable oscillating torque demand that may be generated in relation to operation of the vehicle on a rough driving surface.

20 Claims, 10 Drawing Sheets

(56) References Cited

U.S. PATENT DOCUMENTS

| | | | |
|---|---|---|---|
| 2002/0183163 A1 | 12/2002 | Etchason et al. | |
| 2010/0038158 A1 | 2/2010 | Whitney et al. | |
| 2010/0075803 A1* | 3/2010 | Sharples | F02D 11/105 |
| | | | 477/110 |
| 2010/0286887 A1 | 11/2010 | Marayama | |
| 2014/0306638 A1* | 10/2014 | Wu | H02P 21/20 |
| | | | 318/504 |
| 2015/0088368 A1 | 3/2015 | Varady et al. | |
| 2018/0042174 A1* | 2/2018 | Li | G06F 17/18 |
| 2018/0247094 A1* | 8/2018 | Khojastepour | G01S 13/75 |
| 2020/0055363 A1 | 2/2020 | Paiva et al. | |
| 2022/0176827 A1 | 6/2022 | Otanez et al. | |
| 2022/0410888 A1 | 12/2022 | Nelson | |

FOREIGN PATENT DOCUMENTS

| | | | | |
|---|---|---|---|---|
| DE | 100 11 706 | 9/2001 | | |
| DE | 102005036217 | 2/2007 | | |
| DE | 102010001045 | 7/2011 | | |
| EP | 2 685 069 | 1/2014 | | |
| EP | 3 560 783 | 10/2019 | | |
| FR | 3100194 A1 | 3/2021 | | |
| GB | 2 445 836 | 7/2008 | | |
| JP | 2008161022 A | * | 7/2008 | |
| JP | 2021037798 A | | 3/2021 | |
| KR | 1020200050737 A | | 5/2020 | |
| WO | WO-2017151996 A1 | * | 9/2017 | A61B 17/29 |

OTHER PUBLICATIONS

Translation of CN 113071496 A.*
Translation of JP 2008161022 A.*
European Extended Search Report in Application 22197561.8, dated Feb. 7, 2023, 8 pages.
European Search Report in Application 22181002.1, dated Nov. 30, 2022, 9 pages.

* cited by examiner

AUTOMATED DYNAMIC THROTTLE REQUEST FILTERING

BACKGROUND

When a vehicle is driven on a rough driving surface, undesirable oscillating torque demand can be introduced. For example, operating a vehicle on a rough driving surface may cause the operator's foot to inadvertently move the throttle pedal of the vehicle. When an operator is unable to hold the throttle pedal steady when traversing a rough surface, undesirable drivability and passenger comfort effects may result. In some examples, driveline oscillation and wrap may likely be introduced. For example, the driveline of a vehicle may be prone to a noise and vibration response. This response is sometimes referred to as a wrap or shuffle when subjected to excitation, such as excitation that may be introduced with an unsteady tip-in and tip-out of the throttle pedal when driving on a rough driving surface. In some examples, vehicles with increased masses (e.g., large trucks) may be more prone to driveline oscillation and wrap. As can be appreciated, vehicle operators may expect a quality vehicle and a smooth driving experience, while driveline oscillation and wrap can create a negative perception of the controllability of the vehicle and overall vehicle quality.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing dynamic throttle pedal filtering based on driving surface roughness. For example, aspects of the present disclosure include an automated throttle filtering system that may operate to automatically filter torque inputs to minimize undesired oscillating torque demand.

In one aspect, a system is provided that is configured to provide dynamic throttle pedal filtering of a vehicle. In an example embodiment, the system comprises at least one processor; a memory storage device including instructions that when executed by the at least one processor are configured to: receive a throttle pedal input associated with a position of the throttle pedal; receive rough driving surface magnitude values representing sensed driving surface roughness; receive an indication that a rough driving surface is detected; determine filtered torque demand values based on the throttle pedal input and the rough driving surface magnitude values; and filter the received throttle pedal input by transmitting one or more filtered torque demand requests to one or more powertrain components to perform one or more powertrain actions to move the vehicle based on the filtered torque demand values.

In another aspect, a method for providing dynamic throttle pedal filtering of a vehicle is provided. In an example embodiment, the method comprises: receiving wheel speed signal inputs from a number of wheel speed sensors included on the vehicle; determining, based on the received wheel speed signal inputs, rough driving surface magnitude values representing sensed driving surface roughness; determining whether a rough driving surface is detected; and when a rough driving surface is detected: determining filtered torque demand values based on throttle pedal input corresponding to a vehicle operator's engagement of a throttle pedal and the rough driving surface magnitude values; and filtering the received throttle pedal input by transmitting one or more filtered torque demand requests to one or more powertrain components to perform one or more powertrain actions to move the vehicle based on the filtered torque demand values.

In another aspect, a vehicle that includes a computer-readable storage device is provided, wherein the computer-readable storage device includes computer readable instructions. When executed by a processing unit, the instructions are configured to receive a throttle pedal input associated with a position of the throttle pedal; receive rough driving surface magnitude values representing sensed driving surface roughness; receive an indication that a rough driving surface is detected; determine filtered torque demand values based on the throttle pedal input and the rough driving surface magnitude values; and filter the received throttle pedal input by transmitting one or more filtered torque demand requests to one or more powertrain components to perform one or more powertrain actions to move the vehicle based on the filtered torque demand values.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
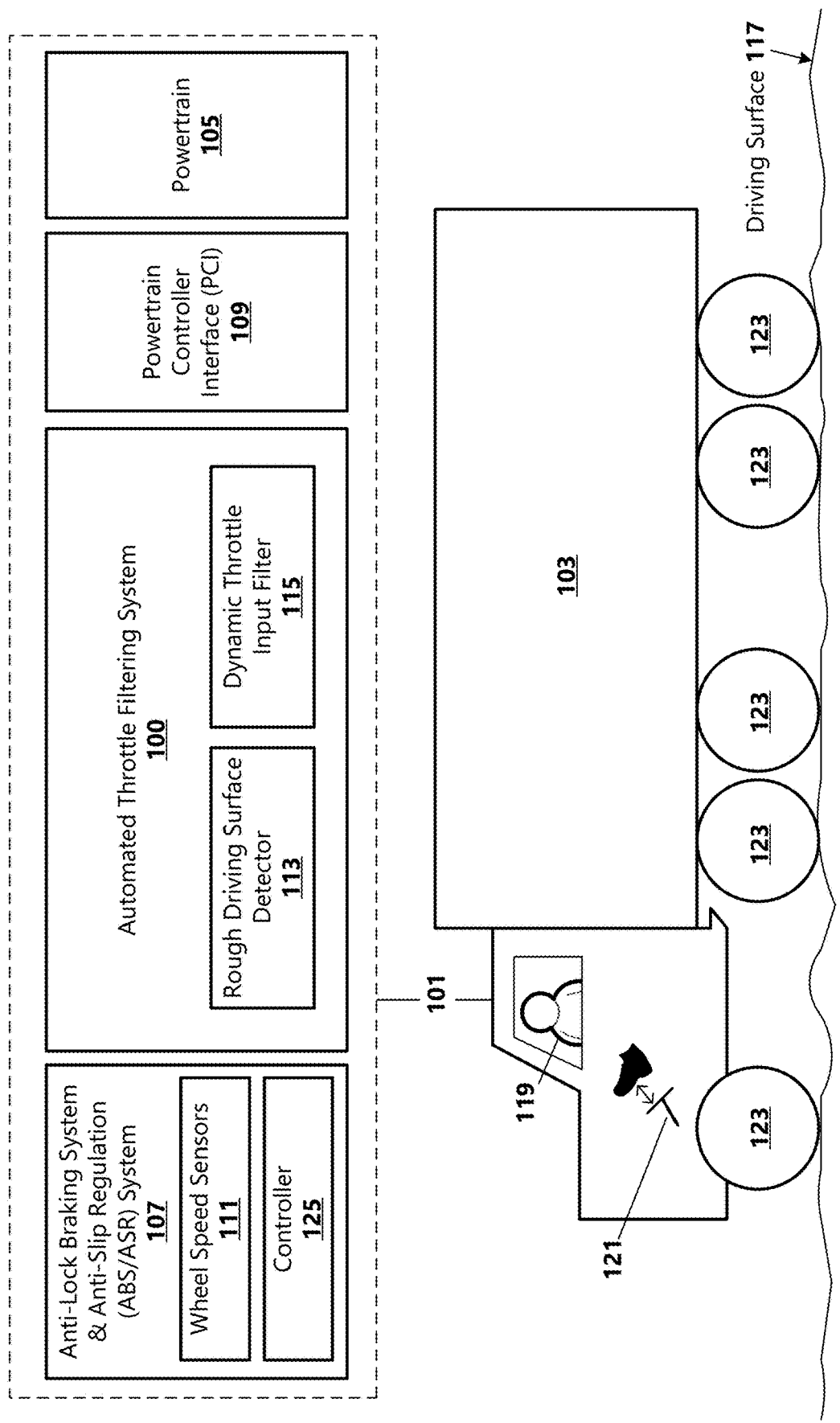
FIG. 1 is an illustration depicting a side view of a vehicle comprising an automated throttle filtering system.

Aspects of the present disclosure are generally directed to systems, methods, and computer readable storage media for providing automated throttle filtering. An automated throttle filtering system may operate to automatically filter torque inputs to minimize undesired oscillating torque demand. Such an automated throttle filtering system provides improvements in detection of a rough driving surface and automated dynamic adjustment of torque demand based on detection of a rough driving surface, thereby improving the driving experience.

The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

With reference now to FIG. 1, an example vehicle 101 is illustrated within which aspects of the present disclosure can be implemented. For example, FIG. 1 includes a side view of the vehicle 101 further including a schematic view of various components that may be included in the vehicle 101 that may operate as part of example implementations of automated throttle filtering. In some examples, the vehicle 101 may be a heavy-duty truck such as a part of a tractor-trailer combination. The vehicle 101 may have what is sometimes referred to as, a fifth wheel by which a box-like, flat-bed, or tanker semi-trailer 103 (among other examples) may be attached for transporting cargo or the like. While the vehicle 101 is depicted as a truck in FIG. 1, it should be appreciated that the present technology is applicable to any type of vehicle where automated throttle filtering may be desired.

As shown, the example vehicle 101 includes a powertrain 105 (shown schematically). The powertrain 105 may operate to generate power and to convert the power into movement. For example, the powertrain 105 may include a power source, such as an engine, and various components that operate to convert the engine's power into movement of the vehicle (e.g. the transmission, driveshafts, differential, and axles). The powertrain 105 may be one of various types of powertrains (e.g., diesel, hydrogen fuel cell, battery electric). In some examples, the vehicle's transmission may be configured to generate torque based on a set of received input criteria. In an example implementation and as will be described in further detail below, the input criteria may include a torque demand signal based on a vehicle operator's 119 engagement of a throttle pedal 121. In another example implementation, the torque demand signal may be filtered by the automated throttle filtering system 100 based on a determination of a rough driving surface 117.

In some examples, the vehicle 101 may include an anti-lock braking system (ABS) and anti-slip regulation (ASR) system (herein referred to as an ABS/ASR system 107). According to an example, the ABS/ASR system 107 may operate as an automated system to prevent the vehicle's wheels 123 from locking up during braking and from spinning during accelerating. For example, without human intervention, the ABS/ASR system 107 may use sensors 111 (e.g., wheel speed sensors) to monitor a rotational speed of at least a subset of the vehicle's wheels 123 for detecting conditions indicative of impending wheel lock (e.g., one or more wheels 123 rotating slower than the speed of the vehicle 101 based on a threshold value), which when detected, may cause a controller 125 of the ABS/ASR system 107 to adjust braking of an affected wheel 123 to maintain tractive contact with the driving surface 117 and allow the vehicle operator 119 to maintain more control over the vehicle 101.

In some examples, the ABS/ASR system 107 may further operate to, without human intervention, use the sensors 111 to monitor a rotational speed of at least a subset of the vehicle's wheels 123 for detecting conditions indicative of wheel slip (e.g., one or more wheels 123 rotating faster than the speed of the vehicle 101 based on a threshold value), which when detected, may cause the controller 125 of the ABS/ASR system 107 to regulate an amount of torque supplied to an affected wheel 123 (e.g., slow down the affected wheel 123 to regain traction). In some examples, the ABS/ASR system 107 may further operate to provide additional torque to an opposite wheel 123 that may have better traction when compared to the spinning wheel 123. In some examples, the ABS/ASR system 107 may further operate to regulate braking of the affected/spinning wheel 123 during acceleration to slow down the wheel to help regain traction.

According to an aspect, the vehicle 101 may include an automated throttle filtering system 100 that be in communication with and interoperate with the ABS/ASR system 107 to filter torque requests that may be communicated to an interface of the powertrain 105 (herein referred to as a powertrain controller interface (PCI) 109 for modulating an undesirable torque demand that may be generated in relation to operation of the vehicle 102 on a rough driving surface 117.

As will be described in further detail below, in various examples, the automated throttle filtering system 100 may be operative or configured to dynamically filter throttle pedal 121 input based on a rough driving surface 117. In some implementations, the automated throttle filtering system 100 may include a rough driving surface detector 113 that may operate to detect a rough driving surface 117 based at least in part on variations in magnitudes of quantized wheel speed signals and ASR status signals received from the ABS/ASR system 107. In some implementations, the automated throttle filtering system 100 may further include a dynamic throttle input filter 115 that may operate to adjust a torque demand associated with the filter throttle pedal 121 input based on the detection of the rough driving surface 117. Example operations of the automated throttle filtering system 100 are described in further detail below with reference to FIGS. 2-7.

Figure 2:
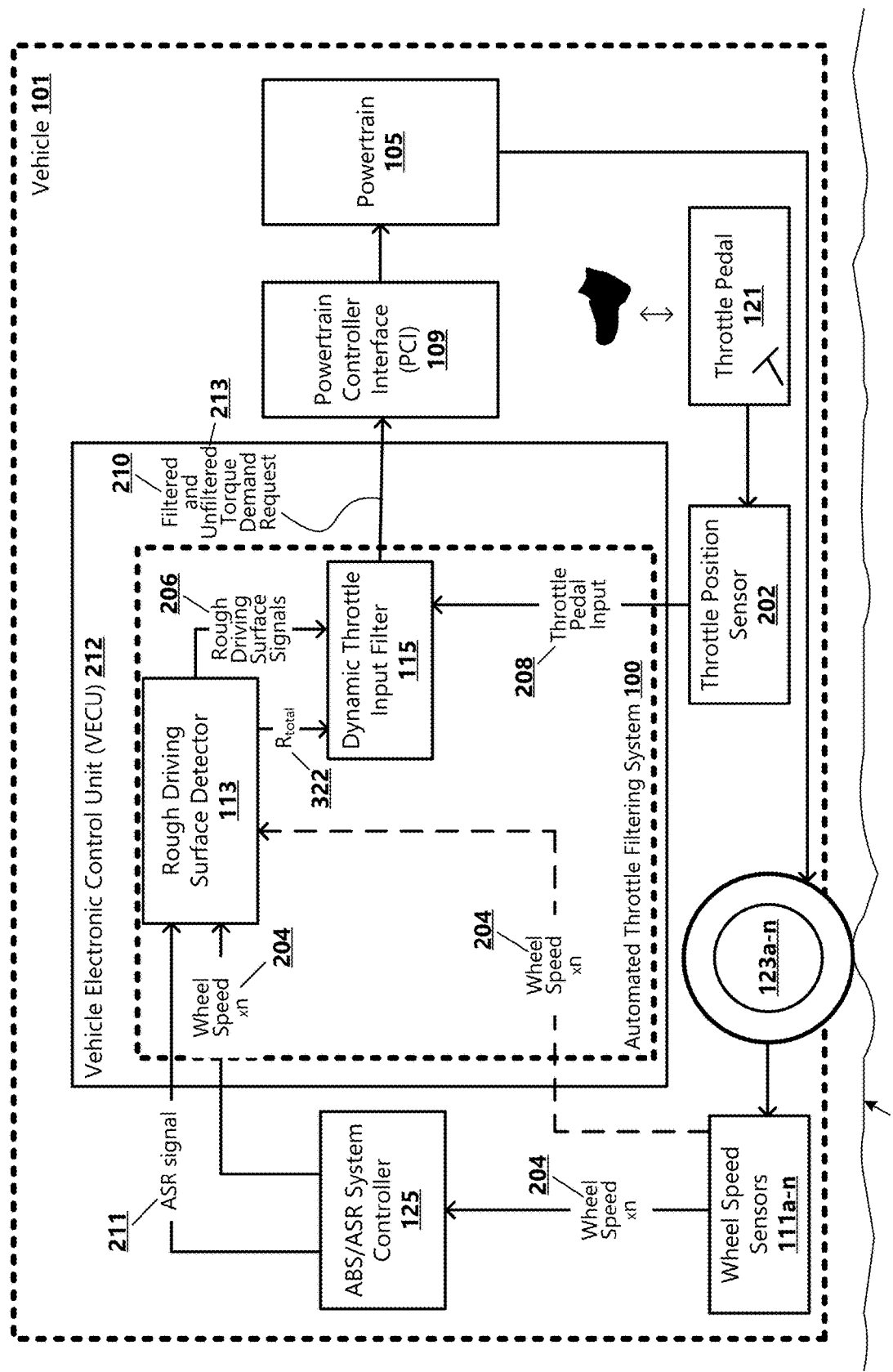
FIG. 2 is a block diagram of an example environment in which an automated throttle filtering system including a dynamic throttle input filter can be implemented according to an embodiment.

With reference now to FIG. 2, an example operating environment is illustrated within which an example automated throttle filtering system 100 may operate. As shown, in some examples, the automated throttle filtering system 100 may operate in a vehicle electronic control unit (VECU) 212 of the vehicle 101. For example, a VECU 212 including the automated throttle filtering system 100 may be operative or configured to house various components (e.g., the rough driving surface detector 113 and/or the dynamic throttle input filter 115) that may operate to detect a rough driving surface 117 and/or dynamically filter throttle pedal 121 input based on detection of the rough driving surface 117 to prevent undesirable torque demand. In other examples, one or more components of the automated throttle filtering system 100 may operate in the ABS/ASR system 107 and communicate a rough driving surface signal 206 and/or filtered torque demand request/signal 210 to the VECU 212. In some examples, the VECU 212 may operate to provide dynamically filtered torque control requests 210 to the PCI 109 to control the vehicle's powertrain 105 for moving the vehicle 101 more smoothly on a rough driving surface 117. In other examples, one or more components of the automated throttle filtering system 100 may operate in the powertrain system 105 or another system included in the vehicle 101.

As mentioned above with respect to FIG. 1, the PCI 109 may operate as an interface for the powertrain 105. In some examples, the PCI 109 may be operative or configured to receive torque demand requests 213 and filtered torque demand requests 210 from the VECU 212 and turn those requests into powertrain actions. The powertrain 105 may be one of various types of powertrains, and the PCI 109 may operate as an intermediate layer between the VECU 212 and the various types of powertrains 105. In some examples, a powertrain action may result in vehicle 101 motion (e.g., acceleration).

Also as mentioned above, the automated throttle filtering system 100 may include the rough driving surface detector 113 and the dynamic throttle input filter 115. As will be described in further detail with reference to FIGS. 3A and 3B, according to an example, the rough driving surface detector 113 is illustrative of a software module, system, or device that may be operative or configured to track various ABS/ASR system 107 conditions and states to determine rough driving surface 117 conditions by quantizing wheel speed signals 204 generated by a plurality of wheel speed sensors 111$a$-$n$ into roughness magnitude values that can be analyzed for identifying values or oscillations in the values indicative of a rough driving surface 117. For example, each wheel speed sensor 111 may operate to measure the road-wheel speed and direction of rotation of a wheel 123$a$-$n$ and to provide an output of the measurement as a signal. In some examples, the wheel speed signals 204 may be received by the ABS/ASR system controller 125, which may operate to communicate the wheel speed signals 204 to the VECU 212. In other examples, the wheel speed sensors 111 may transmit the wheel speed signals 204 directly to the VECU 212. According to one example implementation, four (4) wheel speed sensors 111$a$-$d$ may be included, which may connect to the two steer wheels 123$a$,$b$ and the two (2) front-most drive wheels 123$c$,$d$ of the vehicle 101. In other examples, other configurations of wheel speed sensors 111, including the quantity, location, etc., may be implemented.

In some implementations, the rough driving surface detector 113 may further operate to make a determination associated with whether received inputs indicate a rough driving surface 117 and to communicate rough driving surface signals 206 to the dynamic throttle input filter 115 when a rough driving surface 117 is determined. In one example, the rough driving surface signals 206 may include the quantized roughness magnitude values.

In some examples, the dynamic throttle input filter 115 may further operate to receive throttle pedal input 208 from the throttle pedal 121. For example, the throttle pedal input 208 may include a signal transmitted by a throttle position sensor 202 operative to track the position of the throttle pedal 121.

As will be described in further detail below, according to one example, the dynamic throttle input filter 115 is illustrative of a software module, system, or device that may be operative or configured to receive rough driving surface signals 206 from the dynamic throttle input filter 115 when a rough driving surface 117 is determined, to determine filtered pedal torque demand values based on quantized roughness magnitude values, and to dynamically regulate the received throttle pedal input 208 by including the determined filtered pedal torque demand values in torque demand requests (i.e., filtered torque demand requests 210) communicated to the powertrain 105. Aspects associated with determining a rough driving surface 117 and determining the filtered pedal torque demand values for filtered torque demand requests 210 are described in further detail below with reference to FIGS. 3-7.

Figure 3A:
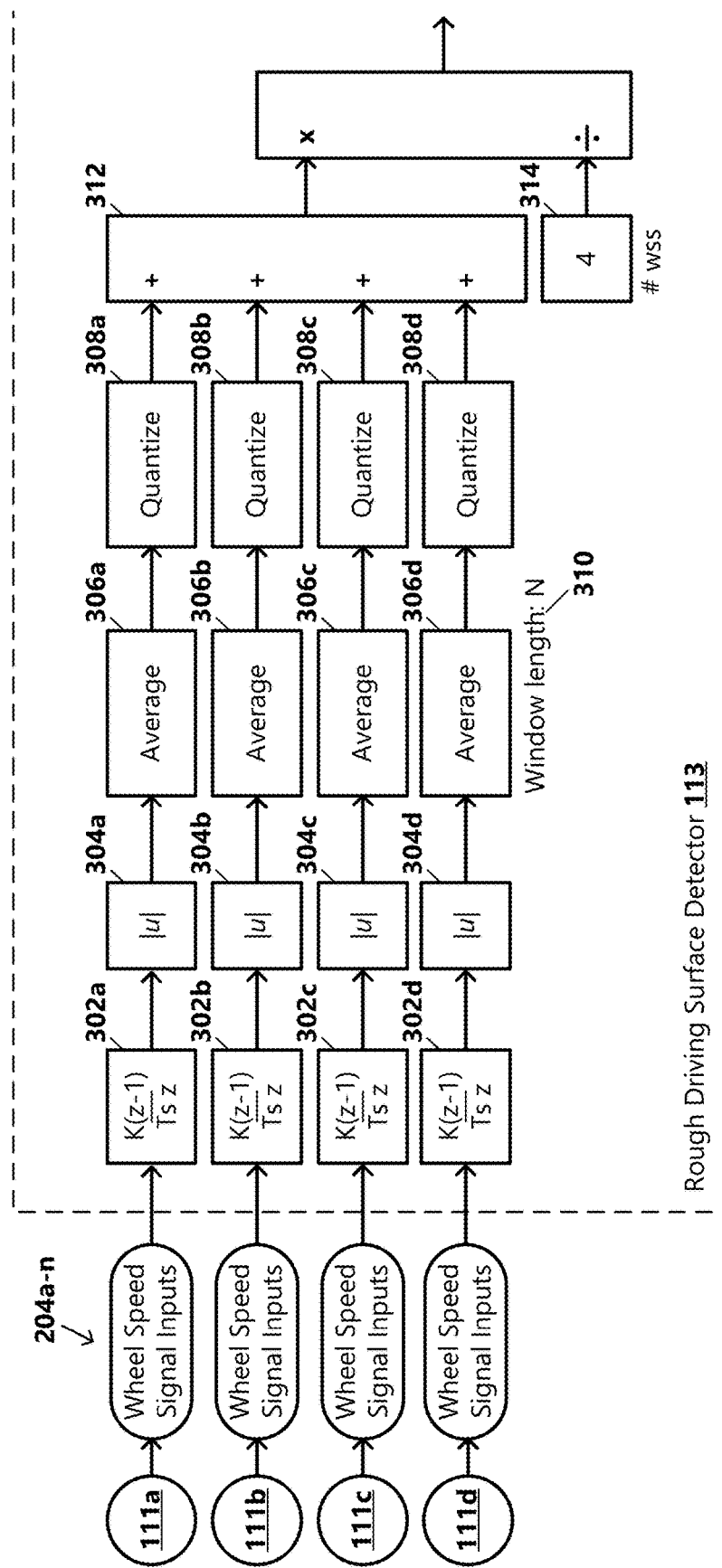
FIGS. 3A and 3B is a block diagram illustrating an example general logic flow for determining a rough driving surface according to an embodiment.
Figure 3B:
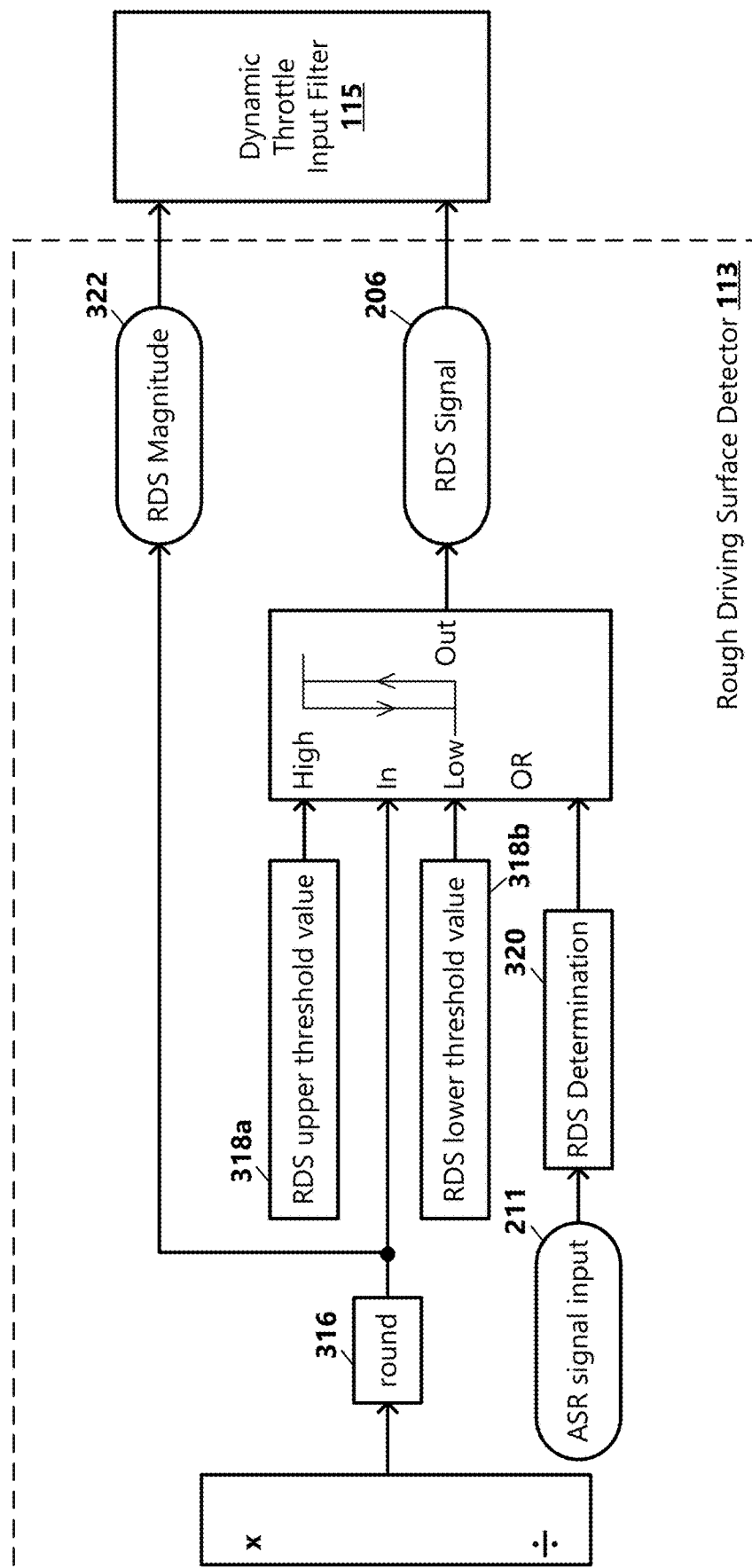

FIGS. 3A and 3B show a block diagram illustrating an example model 300 that may be implemented by the rough driving surface detector 113 to determine a rough driving surface 117. For example, the rough driving surface detector 113 may be configured to quantify the roughness of the driving surface 117 and to use a calibratable threshold to determine whether the driving surface 117 is rough and, therefore, a condition that may limit the vehicle operator's ability to maintain a steady input on the throttle pedal 121. In some examples, the rough driving surface detector 113 may operate to use existing sensors and controllers included in the vehicle 101 to provide determine a rough driving surface 117.

According to an example and as shown in FIG. 3A, the rough driving surface detector 113 may be configured to receive a plurality of wheel speed signal inputs 204$a$-$n$ from a plurality of wheel speed sensors 111 associated with a plurality of wheels 123 on the vehicle 101. In some examples, the rough driving surface detector 113 may operate to, for each wheel 123$a$-$d$, determine an average value 306$a$-$d$ (generally, 306) of the absolute values 304$a$-$d$ (generally, 304) of discrete derivatives 302$a$-$d$ (generally, 302) of received wheel speed signal inputs 204$a$-$n$ (generally, 204) received over a sample size 310 (e.g., 200).

In some examples, the rough driving surface detector 113 may further operate to determine quantized values 308$a$-$d$ of the average values 306$a$-$d$ to assign a continuous value to the wheel speed signal inputs 204$a$-$n$ over the sample size 310. One example equation that may be used to quantize wheel speed signal inputs 204 is:

$$R_{XX} = \Delta \times \left[ \frac{\min\left(\max\left(\left(\sum_{k=0}^{i=t} |V|, 0\right), 60\right)\right)}{6 \times \Delta} + \frac{1}{2} \right],$$

wherein: $R_{xx}$ is an individual wheel roughness magnitude value, and where xx may specify the particular wheel 123 or wheel speed sensor 111 (e.g., front/rear; left/right); $\Delta$ is a quantization interval (e.g., a step size); t is the sample size 310 (e.g., moving average+window length); and V is wheel speed acceleration.

In some examples, the rough driving surface detector 113 may further operate to determine a sum 312 ($R_{sum}$) of the quantized values 308 for all the wheels 123a-d for which wheel speed signal inputs 204a-n are received. According to one example, $$R_{sum} = \begin{cases} 0 \text{ if, AND } (R_{FL} \leq 1, R_{FR} \leq 1, R_{RL} \leq 1, R_{RR} \leq 1) = \text{TRUE} \\ (R_{FL} + 1, R_{FR} + 1, R_{RL} + 1, R_{RR} + 1) \text{ if, AND} \\ (R_{FL} \leq 1, R_{FR} \leq 1, R_{RL} \leq 1, R_{RR} \leq 1) = \text{FALSE} \end{cases}$$

In some examples and with reference now to FIG. 3B, the rough driving surface detector 113 may further operate to determine a rounded quantized roughness value 316 ($R_{total}$) by applying a floor and ceiling function to the sum 312 of the quantized values 308 divided by the number 314 (n) of wheel speed sensors 111. According to one example, $$R_{total} = \left\lfloor \frac{Rsum}{n} \right\rceil.$$

According to an example, the rounded quantized roughness value 316 may be communicated to the dynamic throttle input filter 115 as a rough driving surface magnitude value 322.

In some examples, the rough driving surface detector 113 may operate to evaluate the rounded quantized roughness value 316/rough driving surface magnitude value 322 against one or more calibratable threshold values 318a,b to determine whether the driving surface 117 satisfies conditions for a rough driving surface determination 320. For example, when the rounded quantized roughness value 316/rough driving surface magnitude value 322 meets or exceeds a rough driving surface upper threshold value 318a, the driving surface 117 may be determined to be a rough driving surface.

According to one example implementation, the rough driving surface detector 113 may be configured to make the rough driving surface determination 320 based at least in part on a received ASR signal input 211. For example, an ASR signal input 211, which may indicate a loss of traction in association with one or more wheels 123, may be received (e.g., from the ABS/ASR system controller 125). In some examples, loss of traction as indicated by the ASR signal input may satisfy a condition evaluated by the rough driving surface detector 113 for making the rough driving surface determination 320. According to an example and as shown, when a rough driving surface determination 320 is made, a rough driving surface signal 206 may be communicated to the dynamic throttle input filter 115.

Figure 4:
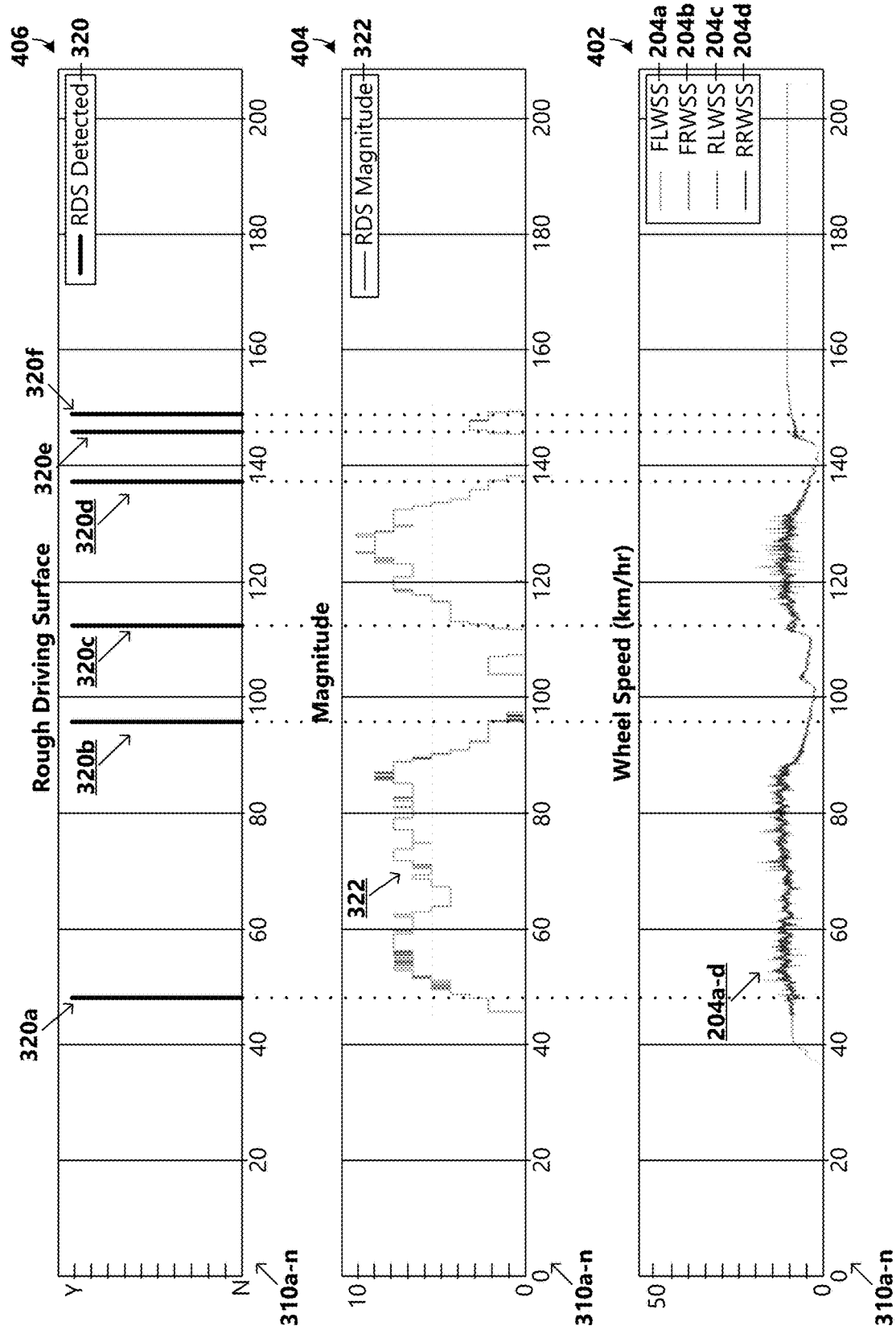
FIG. 4 includes a graph illustrating example wheel speed signal inputs, a graph illustrating example rough driving surface magnitude values, and a graph illustrating example rough driving surface determinations.

With reference now to FIG. 4, example wheel speed signal inputs 204, rough driving surface magnitude values 322, and rough driving surface determinations 320 are shown plotted on various graphs 402, 404, 406. The example wheel speed signal inputs 204, rough driving surface magnitude values 322, and rough driving surface determinations 320 include data received or determined by the automated throttle filtering system 100 in association with a vehicle 101 driving on a broken concrete driving surface 117.

The first graph 402 of FIG. 4 includes a plot of wheel speed signals 204a received from a first wheel speed sensor 111a (e.g., connected to a front-left wheel 123a), wheel speed signals 204b received from a second wheel speed sensor 111b (e.g., connected to a front-right wheel 123b), wheel speed signals 204c received from a third wheel speed sensor 111c (e.g., connected to a rear-left wheel 123c), and wheel speed signals 204d received from a fourth wheel speed sensor 111d (e.g., connected to a rear-right wheel 123d) over a period of time.

The second graph 404 of FIG. 4 includes a plot of the rough driving surface magnitude values 322 determined from the received wheel speed signals 204a-d. For example, and as described above, the rough driving surface magnitude values 322 may be determined by averaging, over a sample size 310, the absolute value 304 of the discrete derivative 302 of the wheel speed signals 204a-d. Accordingly, wheel accelerations may be assigned to stepped values, which are shown in the second graph 404 as the rough driving surface magnitude values 322 plotted over a plurality of sample sizes 310a-n. In some examples, the rough driving surface magnitude values 322 may be communicated to the dynamic throttle input filter 115.

The third graph 406 of FIG. 4 includes a plot of rough driving surface determinations 320a-f made over the plurality of sample sizes 310a-n. For example, when evaluating the rough driving surface magnitude values 322 shown in the second graph 404 against one or more calibratable threshold values 318a,b, the rough driving surface detector 113 may determine that one or more rough driving surface magnitude values 322 satisfy conditions for the rough driving surface determinations 320a-f. According to an example and as shown in the third graph 406, the rough driving surface determinations 320a-f may correspond with variations in the rough driving surface magnitude values 322. According to an aspect, the rough driving surface determinations 320a-f may be communicated to the dynamic throttle input filter 115.

As described above, in some examples, the dynamic throttle input filter 115 may operate to filter torque demand requests based on received rough driving surface determinations 320, such as the example rough driving surface determinations 320a-f made in reference to FIG. 4. According to one example, a limited exponential function may be used to dynamically determine a filtered torque output (e.g., filtered torque demand request 210) based on throttle pedal input 208 produced by a vehicle operator 119 and the driving surface 117. For example, the limited exponential function may include a first equation: v=max(w, 1), where w is an exponent value, and the equation may operate to keep the exponent value at least 1.

The limited exponential function may further include a second equation: s=min (max(dT, T)+$\int_{t=0}^{t}$(dT+max(dT, T))), where dT represents the sample rate, T is a filter time constant value based on driving surface 117 roughness and may correspond proportionally to the rough driving surface magnitude value ($R_{total}$) 322. The second equation may operate to determine s, which may represent a variable utilized in a third equation for determining u.

The third equation may operate as the filter exponential part of the limited exponential function to determine u. For example:

$$u = \left(\frac{x - x_0}{\max(dT, T)^y}\right) \times s^y + x_0,$$

where $x_0$ represents an initialization value to the dynamic throttle input filter 115 based on driving surface 117 roughness, and x represents a translated torque input value based on a pedal map. For example, the pedal map may include a dynamic lookup table that, based on a throttle pedal input 208 received in association with movement of the throttle pedal 121 by the vehicle operator 119, may be used to translate a throttle pedal position (i.e., a pedal saturation value) and throttle pedal ramp rate into a torque demand percent. The pedal map may include pedal position translation information comprising relationships between pedal positions and torque demand associated with the vehicle's particular powertrain 105. For example, various types of powertrains 105 may have different pedal map information. Accordingly, the pedal map may have calibratable values that can be adjusted depending on the powertrain 105 operating to create torque for the vehicle 101. In some examples, the torque demand may further be translated from a percent into a value. For example, various systems included in the vehicle 101 may be configured to understand torque as an actual value. Accordingly, a torque translation table may be used to translate the torque demand percent determined from the pedal map into the translated torque input value (i.e., x) used in the third equation.

The limited exponential function may further include a fourth equation:

$$y = \begin{cases} \max(x, u) & \text{if } x_0 \geq x = \text{TRUE} \\ \min(x, u) & \text{if } x_0 \geq x = \text{FALSE} \end{cases},$$

where y represents the resultant pedal torque demand (e.g., filtered torque demand request 210, unfiltered torque demand request 213) based on the above functions. According to the example limited exponential function, throttle pedal input filtering action may be linearly increased as sensed driving surface 117 harshness (i.e., roughness) increases.

Additionally, the fourth equation may enable negative direction torque demand filtering to be determined independently from positive direction torque demand filtering. For example, positive torque applications may generally be more filtered to minimize unintended positive torque application. For example, torque demand may be filtered more on a rising edge of the demand (e.g., increase in acceleration), in comparison with a falling edge (e.g., decrease in acceleration). For example, increased filtering torque demand on the falling edge may result in unintended acceleration of the vehicle 101 that may prevent the vehicle 101 from slowing down as the vehicle operator 119 may intend, whereas increased filtering on the rising edge of the demand may prevent unintended jerking ahead of the vehicle 101.

Figure 5:
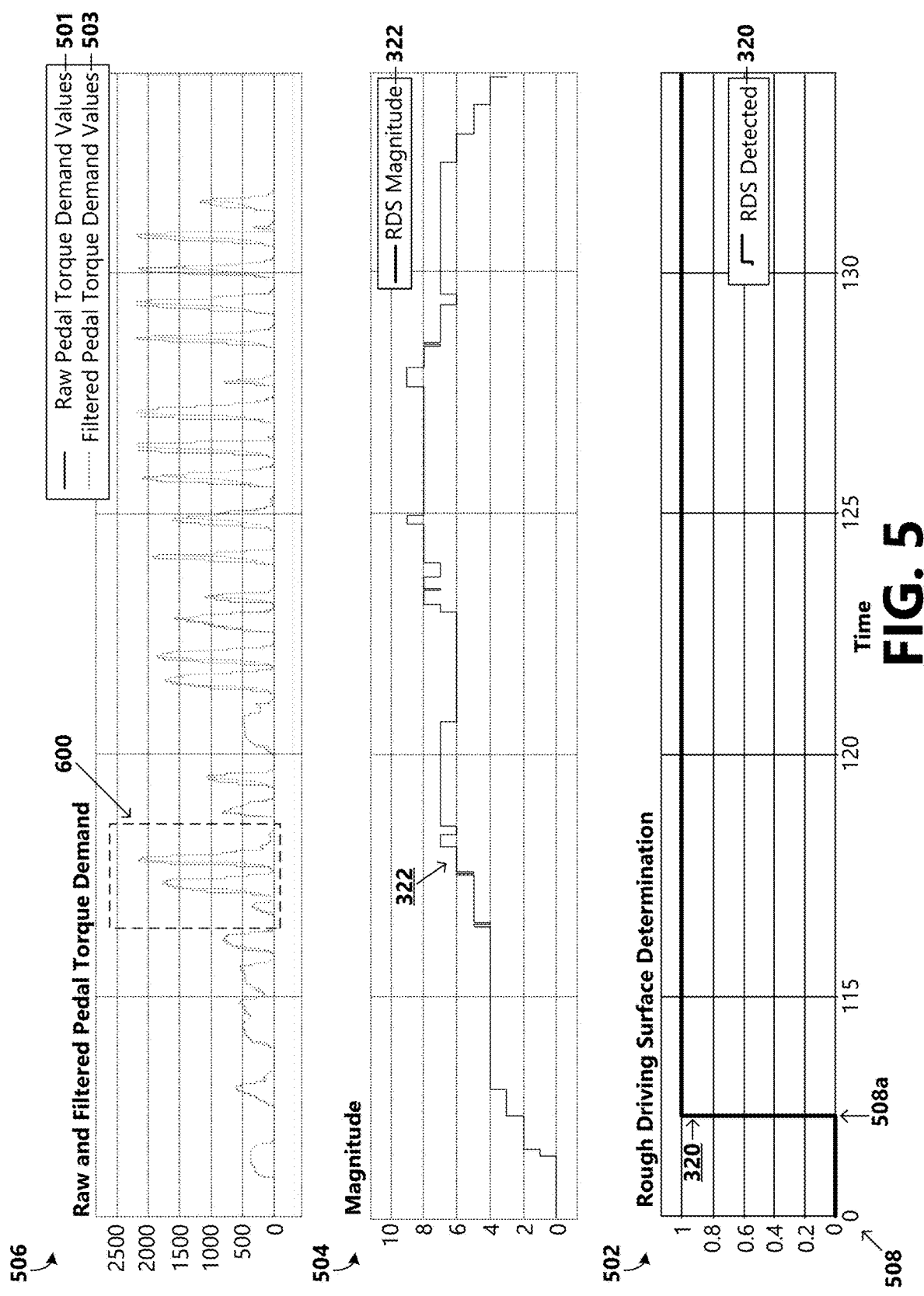
FIG. 5 includes a graph illustrating example rough driving surface determinations, a graph illustrating example rough driving surface magnitude values, and a graph illustrating example raw torque demand values and filtered pedal torque demand values.

With reference now to FIG. 5, example rough driving surface determinations 320, rough driving surface magnitude values 322, and raw torque demand values 501 and filtered pedal torque demand values 503 are shown plotted on various graphs 502, 504, 506. The example rough driving surface determinations 320, rough driving surface magnitude values 322, and raw and filtered pedal torque demand values 501,503 include data received or determined by the automated throttle filtering system 100 in association with a vehicle 101 driving on a broken concrete driving surface 117.

The first graph 502 of FIG. 5 includes a plot of a rough driving surface determination 320 made over a period of time 508. For example and as shown, a rough driving surface 117 may be detected by the rough driving surface detector 113 starting at approximately a 55 time 508a measurement mark. The determination 320 may be made based on received wheel speed signals 204 and/or ASR signals 211, and the determination 320 and associated rough driving surface magnitude values 322 may be communicated to the dynamic throttle input filter 115 for making a determination on the resulting dynamically filtered torque output (e.g., filtered pedal torque demand values 503 that may be included in filtered pedal torque demand requests 210 communicated to the powertrain 105).

The second graph 504 of FIG. 5 includes a plot of the rough driving surface magnitude values 322 that may be received from the rough driving surface detector 113.

The third graph 506 of FIG. 5 includes a plot of raw/unfiltered torque demand values 501 and filtered torque demand values 503. The raw/unfiltered torque demand values 501 may represent example torque demand values that may be determined for a received throttle pedal input 208 and then communicated to the powertrain 105 when aspects of the automated throttle filtering system 100 are not implemented. The filtered torque demand values 503 may represent example torque demand values that may be determined by the dynamic throttle input filter 115 for a received throttle pedal input 208 based at least in part on the received rough driving surface determination 320 and the rough driving surface magnitude values 322 shown in the first and second graphs 502, 504.

Figure 6:
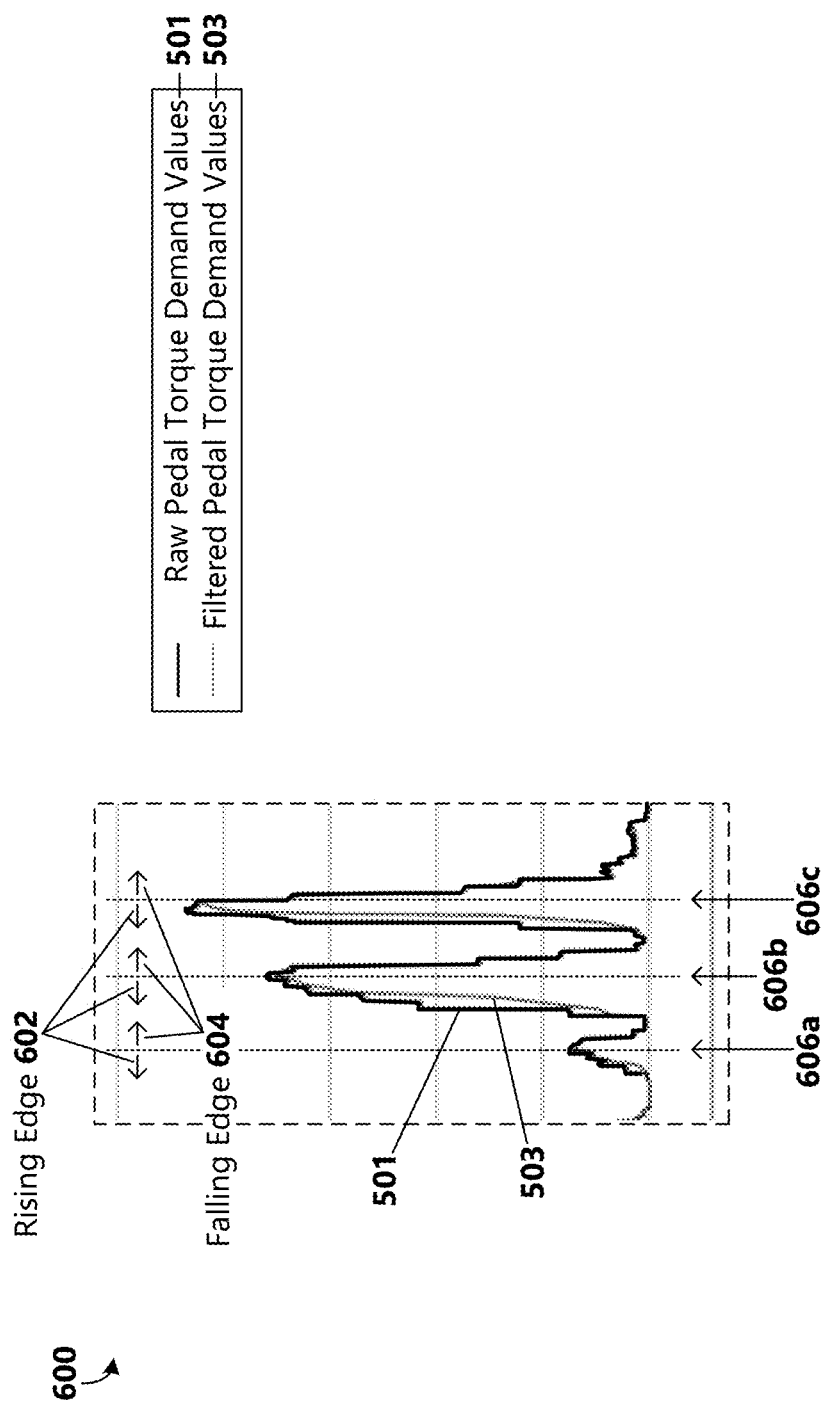
FIG. 6 is an illustration of a magnified view of a portion of the third graph illustrating example raw torque demand values and filtered pedal torque demand values in FIG. 5.

With reference now to FIG. 6 and as shown in a magnified view 600 of a portion of the third graph 506 of FIG. 5, the filtered torque demand values 503 of the example torque demand oscillations 606a,b,c may be smoother in comparison with the raw/unfiltered torque demand values 501. Accordingly, when the filtered torque demand values 503 are included in torque demand requests (i.e., filtered torque demand requests 210) communicated to the powertrain 105, the resulting torque output generated by the powertrain 105 may correspond to the smoother filtered torque demand values 503. That is, the filtered torque demand 210 may reduce or eliminate undesirable oscillating torque demand (e.g., 606a, 606b, 606c) and, in some examples, driveline oscillation and wrap, that may otherwise be experienced when traversing a rough driving surface 117.

As mentioned above, in some examples, positive direction torque demand filtering may be determined independently from negative direction torque demand filtering. For example and as illustrated, the filtered torque demand values 503 on the rising edges 602 of the example torque demand oscillations 606a,b,c may be more heavily filtered (e.g., based on the example fourth equation described above) in comparison with the falling edges 604 example torque demand oscillations 606a,b,c. For example, increased filtering torque demand on the falling edges 604 may result in unintended acceleration of the vehicle 101 that may prevent the vehicle 101 from slowing down as the vehicle operator 119 may intend, whereas increased filtering on the rising edge 602 of the demand may prevent unintended jerking ahead of the vehicle 101. Aspects of the automated throttle filtering system 100 may improve vehicle 101 controllability, which may provide a positive vehicle operator 119 experience and satisfy the operator's expectation for a quality vehicle 101.

Figure 7:
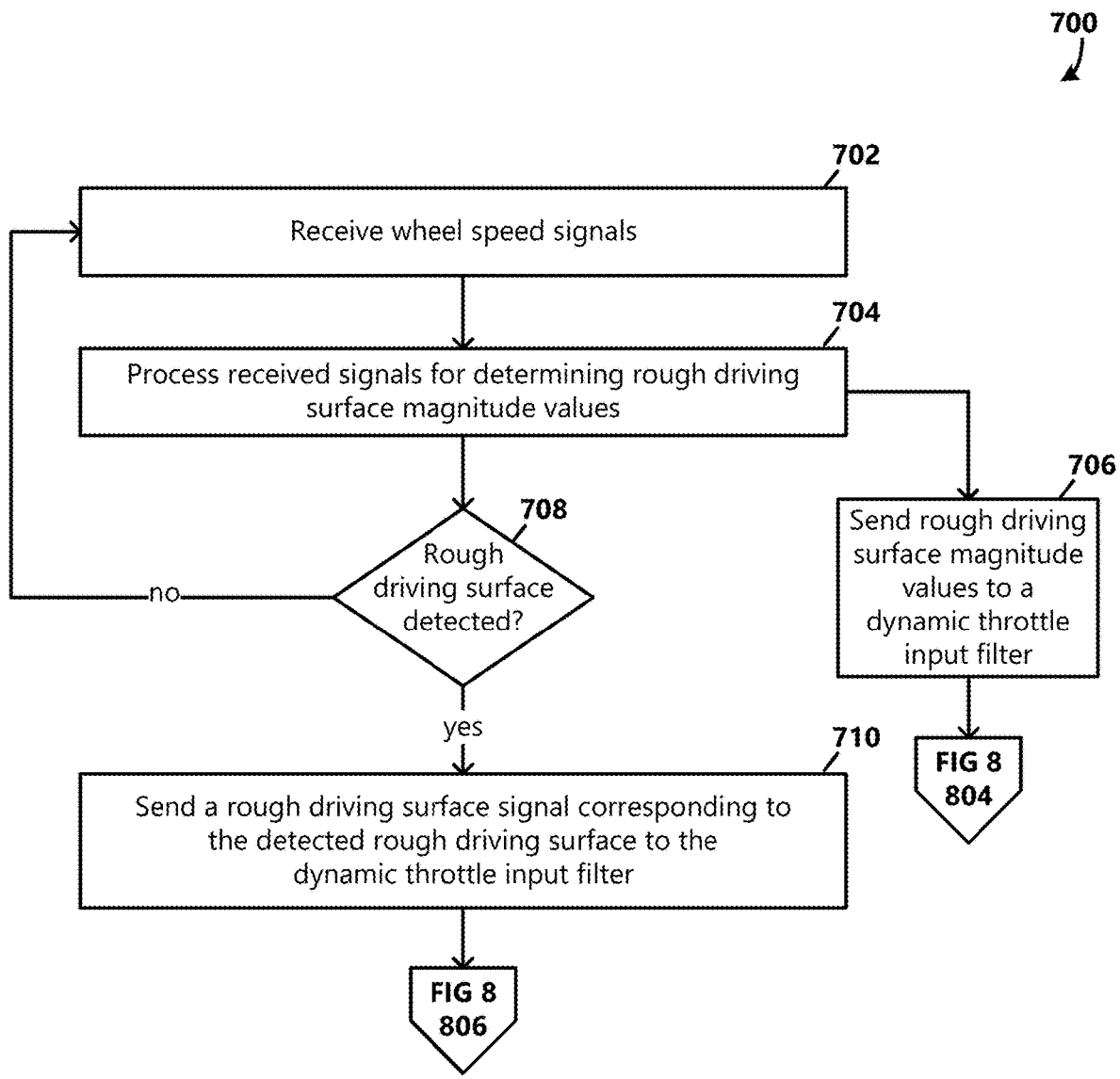
FIG. 7 is a flow diagram depicting general stages of an example process for making and communicating a rough driving surface determination according to an embodiment.

With reference now to FIG. 7, a flow diagram is shown depicting general stages of an example method 700 for providing a rough driving surface determination according to an embodiment. For example, the operations included in FIG. 7 may include example operations that may be performed by the rough driving surface detector 113 while a vehicle 101 is traversing a driving surface 117. In some examples, the operations may be performed perpetually during driving operation of the vehicle 101. At OPERATION 702, wheel speed signals 204 (including wheel speed measurements) generated by a plurality of wheel speed sensors 111 associated with a plurality of wheels 123 on the vehicle 101 may be received.

At OPERATION 704, the wheel speed signals 204 may be processed for quantifying roughness of a driving surface 117. According to one example implementation and with reference back to the example general logic flow for detecting a rough driving surface 117 illustrated in FIGS. 3A-B, the wheel speed signals 204 may be received as inputs, and discrete derivatives 302 of the received wheel speed signal inputs 204 may be determined. Further, the absolute values 304 of the discrete derivatives 302 may be averaged over a sample size 310. In some examples, the average values 306 may be further processed to determine quantized individual wheel roughness magnitude values 308 such that a continuous value to the wheel speed signal inputs 204a-n over the sample size 310. For example, individual wheel roughness magnitude values may be determined for each of the plurality of wheels 123 for which wheel speed signals 204 are received by applying a quantizing algorithm to the average values 306. Further, a rounded quantized roughness value 316 (e.g., also referred to as the rough driving surface magnitude value 322) may be determined by applying a floor and ceiling function to the sum 312 of the quantized individual wheel roughness magnitude values 308 divided by the number 314 (n) of wheel speed sensors 111. The method 700 may proceed to OPERATIONS 706 and 708.

At OPERATION 706, the determined rough driving surface magnitude value 322 may be communicated to the dynamic throttle input filter 115. Example operations performed by the dynamic throttle input filter 115, such as operations associated with receiving rough driving surface magnitude values 322, are described below with reference to FIG. 8.

At DECISION OPERATION 708, a determination may be made as to whether the rounded quantized roughness value 316/rough driving surface magnitude value 322 satisfies conditions for a rough driving surface determination 320. According to one example, a determination may be made that a rough driving surface 117 has been detected when the rounded quantized roughness value 316/rough driving surface magnitude value 322 meets or exceeds a rough driving surface upper threshold value 318a. According to another example, the rough driving surface determination 320 may further be based on a received ASR signal input 211. In some examples, loss of traction as indicated by the ASR signal input 211 may satisfy a condition for making the rough driving surface determination 320.

When a determination 320 is made that a rough driving surface 117 has been detected, at OPERATION 710, an associated rough driving surface signal 206 may be communicated to the dynamic throttle input filter 115. Example operations performed by the dynamic throttle input filter 115, such as operations associated with receiving the rough driving surface signal 206, are described below with reference to FIG. 8.

Figure 8:
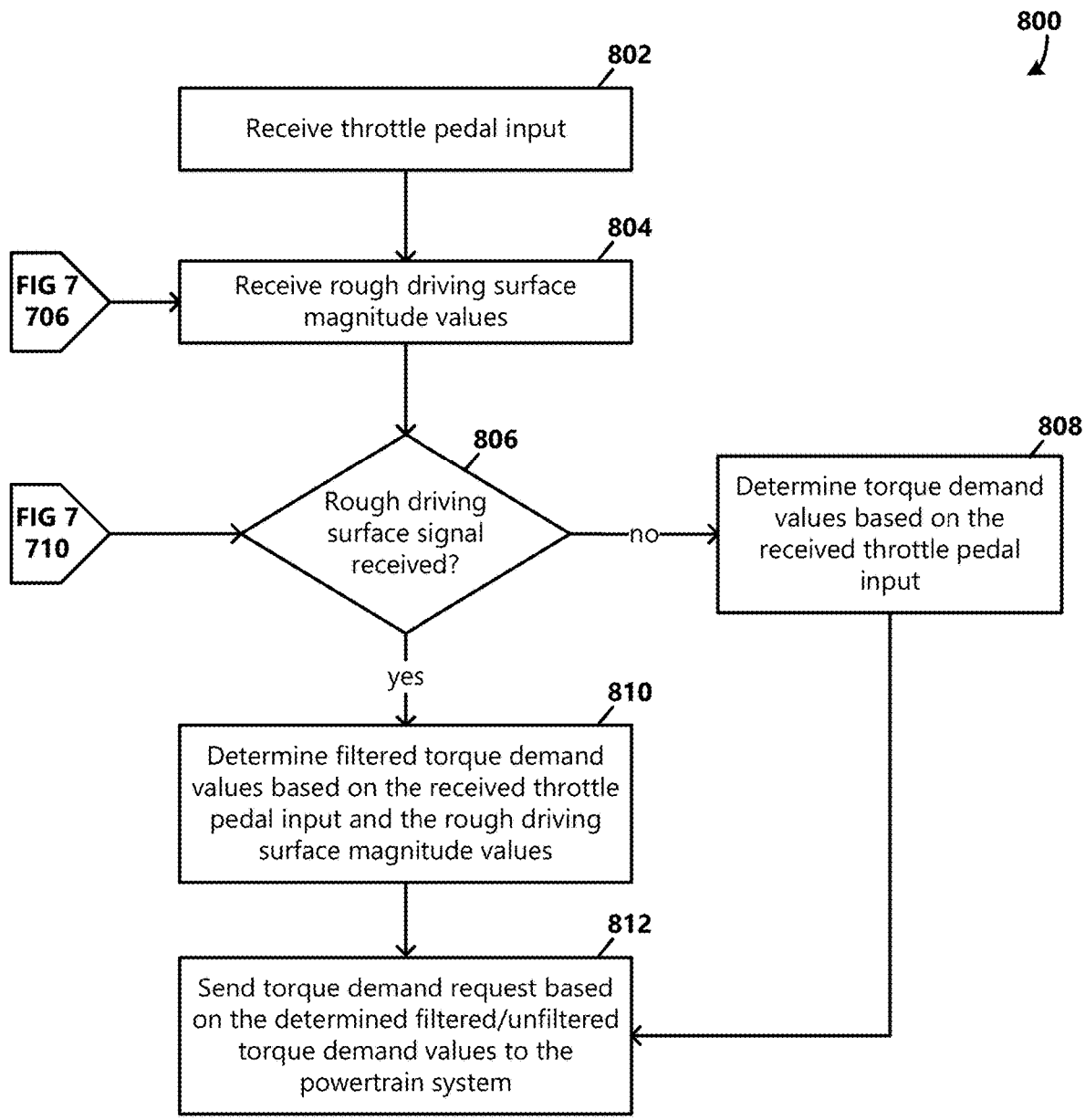
FIG. 8 is a flow diagram depicting general stages of an example process for providing dynamic throttle pedal filtering based on the rough driving surface determination according to an embodiment.

With reference now to FIG. 8, a flow diagram is shown depicting general stages of an example method 800 for providing dynamic throttle pedal filtering based on a rough driving surface determination 320. For example, the operations included in FIG. 8 may include example operations that may be performed by the dynamic throttle input filter 115 as part of filtering oscillating throttle pedal input 208 according to an embodiment.

At OPERATION 802, throttle pedal input 208 may be received. For example, the throttle pedal input 208 may include a signal transmitted by a throttle position sensor 202 representing a position of the throttle pedal 121 (e.g., pedal saturation value).

At OPERATION 804, rough driving surface magnitude values 322 may be received. For example, the rough driving surface magnitude values 322 may include the rough driving surface magnitude values 322 determined by the rough driving surface detector 113 at OPERATION 704 and communicated to the dynamic throttle input filter 115 at OPERATION 706 in FIG. 7.

At DECISION OPERATION 806, a determination may be made as to whether to filter the throttle pedal input 208 received at OPERATION 802. For example, a determination may be made as to whether a rough driving surface signal 206 has been received indicative that a rough driving surface 117 has been detected. For example, the rough driving surface signal 206 may include the rough driving signals 206 sent to the dynamic throttle input filter 115 responsive to a detection of a rough driving surface 117 by the rough driving surface detector 113 at OPERATION 710 and DECISION OPERATION 708 in FIG. 7.

When a rough driving surface 117 has not been detected at DECISION OPERATION 806, the method 800 may proceed to OPERATION 808, where torque demand values may be determined based on the throttle pedal input 208 received at OPERATION 802. For example, the throttle pedal input 208 may be translated into a torque demand percent and value.

When a rough driving surface 117 has been detected at DECISION OPERATION 806, the method 800 may proceed to OPERATION 810, where the throttle pedal input 208 received at OPERATION 802 may be filtered based on the rough driving surface magnitude values 322 received at OPERATION 804. In some examples, the dynamic throttle input filter 115 may determine filtered torque demand values 503 using the example limited exponential function and the pedal map as described above.

At OPERATION 812, a torque demand request may be communicated to the powertrain system 105. For example, the torque demand request may be an unfiltered torque demand request 213 including the torque demand values determined at OPERATION 808 or a filtered torque demand request 210 including filtered torque demand values 503 determined at OPERATION 810. The powertrain 105 may generate torque to move the vehicle 101 based on the unfiltered or filtered torque demand values. When a filtered torque demand request 210 including filtered torque demand values 503 is received, the powertrain 105 may generate a smoother torque output that may reduce or eliminate undesirable oscillating torque demand (e.g., 606) and, in some examples, driveline oscillation and wrap, that may otherwise be experienced when traversing a rough driving surface 117.

Figure 9:
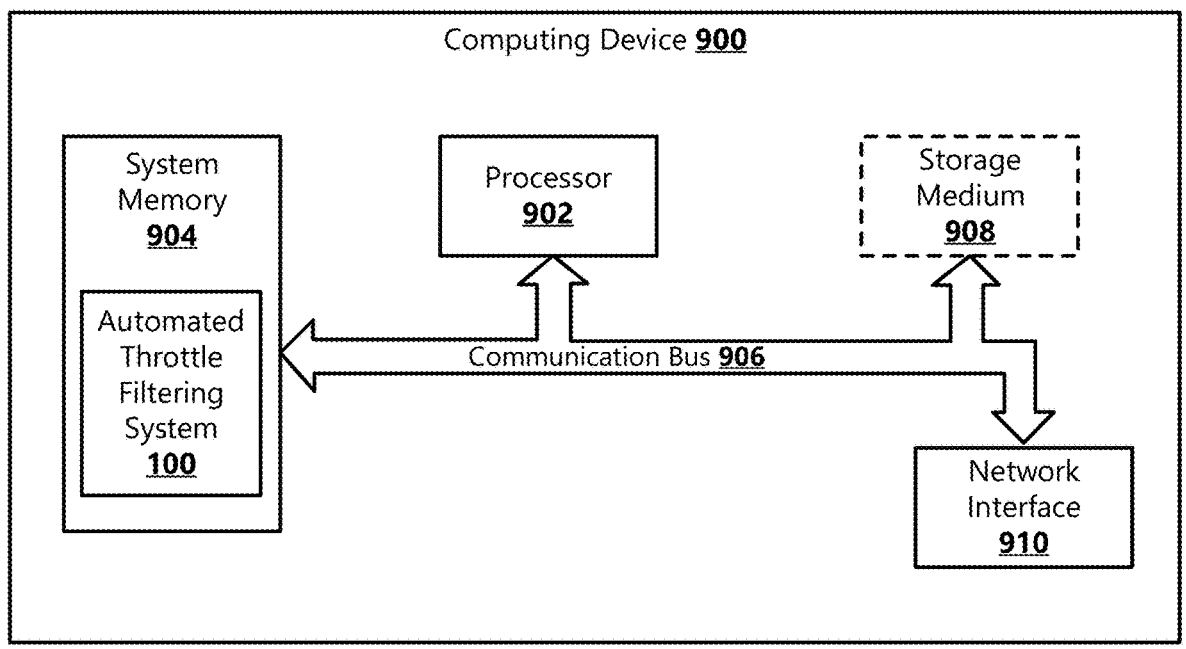
FIG. 9 is a block diagram of an example physical components of a computing device or system with which embodiments may be practiced.

FIG. 9 is a block diagram of an illustrative computing device 900 appropriate for use in accordance with embodiments of the present disclosure. The description below is applicable to the VECU 212, servers, personal computers, mobile phones, smart phones, tablet computers, embedded computing devices, and other currently available or yet-to-be-developed devices that may be used in accordance with embodiments of the present disclosure.

In its most basic configuration, the computing device 900 includes at least one processor 902 and a system memory 904 connected by a communication bus 906. Depending on the exact configuration and type of device, the system memory 904 may be volatile or nonvolatile memory, such as read-only memory ("ROM"), random access memory ("RAM"), EEPROM, flash memory, or other memory technology. Those of ordinary skill in the art and others will recognize that system memory 904 typically stores data or program modules that are immediately accessible to or currently being operated on by the processor 902. In this regard, the processor 902 may serve as a computational center of the computing device 900 by supporting the execution of instructions. According to one example, the system memory 904 may store one or more components of the automated throttle filtering system 100.

As further illustrated in FIG. 9, the computing device 900 may include a network interface 910 comprising one or more components for communicating with other devices over a network. Embodiments of the present disclosure may access basic services that utilize the network interface 910 to perform communications using common network protocols. The network interface 910 may also include a wireless network interface configured to communicate via one or more wireless communication protocols, such as WiFi, 2G, 3G, 4G, 5G, LTE, WiMAX, Bluetooth, or the like.

In the illustrative embodiment depicted in FIG. 9, the computing device 900 also includes a storage medium 908. However, services may be accessed using a computing device that does not include means for persisting data to a local storage medium. Therefore, the storage medium 908 depicted in FIG. 9 is optional. In any event, the storage medium 908 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 904 and storage medium 908 depicted in FIG. 9 are examples of computer-readable media.

For ease of illustration and because it is not important for an understanding of the claimed subject matter, FIG. 9 does not show some of the typical components of many computing devices. In this regard, the computing device 900 may include input devices, such as a keyboard, keypad, mouse, trackball, microphone, video camera, touchpad, touchscreen, electronic pen, stylus, or the like. Such input devices may be coupled to the computing device 900 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 900 (e.g., a client device), or can be integral components of the computing device 900. In some embodiments, multiple input devices may be combined into a single, multifunction input device (e.g., a video camera with an integrated microphone). The computing device 900 may also include output devices such as a display, speakers, printer, etc. The output devices may include video output devices such as a display or touchscreen. The output devices also may include audio output devices such as external speakers or earphones. The output devices can be separate from and communicatively coupled to the computing device 900, or can be integral components of the computing device 900. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The invention claimed is:

1. A system for providing dynamic throttle pedal filtering of a vehicle, the system comprising:
   at least one processor;
   a memory storage device including instructions that when executed by the at least one processor are configured to:
      receive a throttle pedal input associated with a position of the throttle pedal;
      receive rough driving surface magnitude values representing sensed driving surface roughness;
      receive an indication that a rough driving surface is detected;
      determine filtered torque demand values based on a calculated combination of the throttle pedal input and the rough driving surface magnitude values; and
      filter the received throttle pedal input by transmitting one or more filtered torque demand requests to one or more powertrain components to perform one or more powertrain actions to move the vehicle based on the filtered torque demand values.

2. The system of claim 1, wherein the filtered torque demand values are determined based on a limited exponential function.

3. The system of claim 2, wherein the filtered torque demand values correspond linearly to the rough driving surface magnitude values.

4. The system of claim 1, wherein in determining the filtered torque demand values, the system is operative to determine the filtered torque demand values for negative direction torque independently from the filtered torque demand values for positive direction torque.

5. The system of claim 4, wherein the system is operative to filter positive direction torque more heavily in comparison with negative direction torque.

6. The system of claim 1, wherein the system is further operative to determine the rough driving surface magnitude values, wherein in determining the rough driving surface magnitude values, the system is operative to:
   receive a plurality of wheel speed signal inputs from a number of wheel speed sensors included on the vehicle;
   for each wheel speed sensor, determine quantized individual wheel roughness magnitude values; and
   apply a floor and ceiling function to a sum of the quantized individual wheel roughness magnitude values determined for each wheel speed sensor divided by the number of wheel speed sensors.

7. The system of claim 6, wherein in determining the quantized individual wheel roughness magnitude values, the system is operative to:
   determine discrete derivatives of the received wheel speed signal inputs;
   determine absolute values of the discrete derivatives of the received wheel speed signal inputs; and
   determine a quantized individual wheel roughness magnitude value by averaging the absolute values of the discrete derivatives of the received wheel speed signal inputs over a sample size and applying a quantizing algorithm to the average.

8. The system of claim 1, wherein the system is operative to detect the rough driving surface based on:
   the rough driving surface magnitude values; or
   an anti-slip regulation signal.

9. The system of claim 8, wherein in detecting the rough driving surface based on the rough driving surface magnitude values, the system is operative to:
   evaluate the rough driving surface magnitude values against a rough driving surface upper threshold value; and
   when the rough driving surface magnitude values meet or exceed the rough driving surface upper threshold value, determine that a rough driving surface is detected.

10. A method for providing dynamic throttle pedal filtering of a vehicle, comprising:
    receiving wheel speed signal inputs from a number of wheel speed sensors included on the vehicle;
    determining, based on the received wheel speed signal inputs, rough driving surface magnitude values representing sensed driving surface roughness;
    determining whether a rough driving surface is detected; and
    when a rough driving surface is detected:
       determining filtered torque demand values based on a calculated combination of a throttle pedal input corresponding to a vehicle operator's engagement of a throttle pedal and the rough driving surface magnitude values; and
       filtering the received throttle pedal input by transmitting one or more filtered torque demand requests to one or more powertrain components to perform one or more powertrain actions to move the vehicle based on the filtered torque demand values.

11. The method of claim 10, wherein determining the filtered torque demand values comprises:
    using a limited exponential function; and
    determining filtered torque demand values that correspond linearly to the rough driving surface magnitude values.

12. The method of claim 10, wherein determining the filtered torque demand values comprises determining the filtered torque demand values for negative direction torque independently from the filtered torque demand values for positive direction torque.

13. The method of claim 12, wherein the positive direction torque is filtered more heavily in comparison with the negative direction torque.

14. The method of claim 10, wherein determining the rough driving surface magnitude values comprises:
    for each wheel speed sensor, determining quantized individual wheel roughness magnitude values; and
    applying a floor and ceiling function to a sum of the quantized individual wheel roughness magnitude values determined for each wheel speed sensor divided by the number of wheel speed sensors.

15. The method of claim 14, wherein determining the quantized individual wheel roughness magnitude values comprises:
   determining discrete derivatives of the received wheel speed signal inputs;
   determining absolute values of the discrete derivatives of the received wheel speed signal inputs; and
   determining a quantized individual wheel roughness magnitude value by averaging the absolute values of the discrete derivatives of the received wheel speed signal inputs over a sample size and applying a quantizing algorithm to the average.

16. The method of claim 10, wherein determining whether a rough driving surface is detected comprises:
   detecting a rough driving surface based on:
      the rough driving surface magnitude values; or
      an anti-slip regulation signal.

17. The method of claim 16, wherein detecting the rough driving surface based on the rough driving surface magnitude values comprises:
   evaluating the rough driving surface magnitude values against a rough driving surface upper threshold value; and
   when the rough driving surface magnitude values meet or exceed the rough driving surface upper threshold value, determining that a rough driving surface is detected.

18. A vehicle having a computer readable storage device configured to store computer readable instructions, which when executed by a processor, are configured to cause the vehicle to:
   receive a throttle pedal input associated with a position of the throttle pedal;
   receive rough driving surface magnitude values representing sensed driving surface roughness;
   receive an indication that a rough driving surface is detected;
   determine filtered torque demand values based on a calculated combination of the throttle pedal input and the rough driving surface magnitude values; and
   filter the received throttle pedal input by transmitting one or more filtered torque demand requests to one or more powertrain components to perform one or more powertrain actions to move the vehicle based on the filtered torque demand values.

19. The vehicle of claim 18, wherein the instructions are further configured to determine the rough driving surface magnitude values, wherein in determining the rough driving surface magnitude values, the vehicle is operative to:
   receive a plurality of wheel speed signal inputs from a number of wheel speed sensors included on the vehicle;
   for each wheel speed sensor:
      determine discrete derivatives of the received wheel speed signal inputs;
      determine absolute values of the discrete derivatives of the received wheel speed signal inputs; and
      determine a quantized individual wheel roughness magnitude value by averaging the absolute values of the discrete derivatives of the received wheel speed signal inputs over a sample size and applying a quantizing algorithm to the average;
   apply a floor and ceiling function to a sum of the quantized individual wheel roughness magnitude values determined for each wheel speed sensor divided by the number of wheel speed sensors.

20. The vehicle of claim 18, wherein the instructions are further configured to detect the rough driving surface based on:
   an anti-slip regulation signal; or
   based on an evaluation of the rough driving surface magnitude values against a rough driving surface upper threshold value; and
   when the rough driving surface magnitude values meet or exceed the rough driving surface upper threshold value, determine that a rough driving surface is detected.

* * * * *